Nov. 5, 1968   F. G. MORITZ   3,409,240
CONTROL CIRCUIT FOR TAPE REEL SERVO MOTORS
Filed April 27, 1966
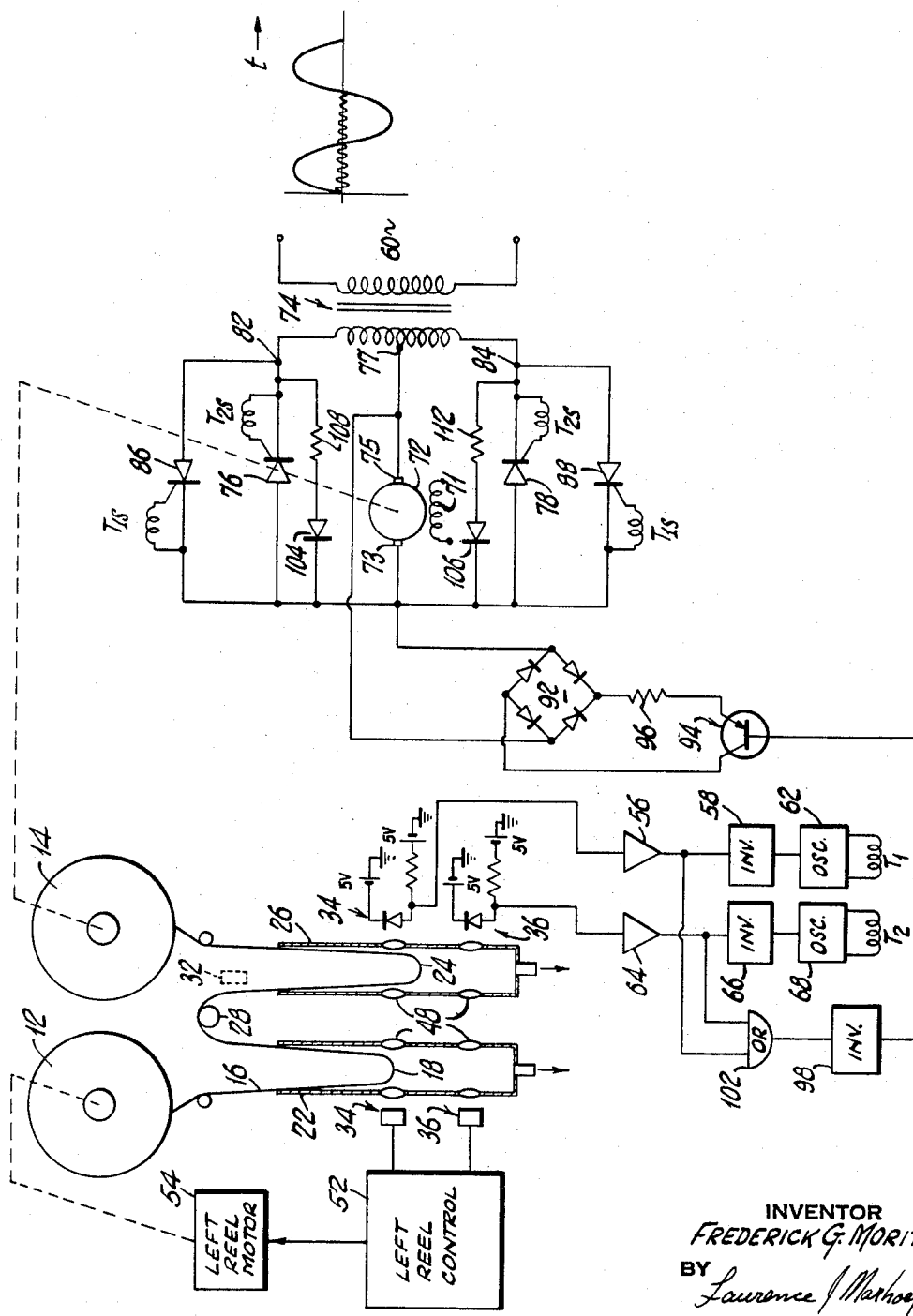
INVENTOR
FREDERICK G. MORITZ
BY
Laurence J. Marhoefer
ATTORNEY United States Patent Office 3,409,240
Patented Nov. 5, 1968

3,409,240
CONTROL CIRCUIT FOR TAPE REEL
SERVO MOTORS
Frederick G. Moritz, Hauppauge, N.Y., assignor to Potter Instrument Company, Inc., Plainview, N.Y., a corporation of New York
Filed Apr. 27, 1966, Ser. No. 545,769
2 Claims. (Cl. 242—55.12)

ABSTRACT OF THE DISCLOSURE

The specification and drawings disclose a reel servo system for a magnetic tape transport in which the reel is driven in one direction when the buffering tape loop is too short, driven in the opposite direction when the buffering loop is too long, and the kinetic energy of the motor is dissipated when the buffering loop is of intermediate length.

---

This invention relates to information storage tape transports, and, more particularly, to an improved reel-motor control circuit.

The co-pending application of Andrew Gabor entitled "Storage Tape Transport and Motor Control System," Ser. No. 498,379, filed Oct. 20, 1965, discloses a three position reel-motor control system. In this system, a control circuit responds to the position of a buffering tape loop relative to two discrete sensors mounted in a vacuum chamber. If the tape rises above the upper sensor, the control circuit energizes the reel-motor associated with the chamber to drive the reel at full speed in a direction to feed tape into the chamber. If the loop falls below the lower sensor, the motor is energized to drive the reel at full speed in a direction to remove tape from the chamber. When the loop is between sensors, the motor is electrodynamically braked.

The system disclosed in the Gabor application has proved generally satisfactory. However, the circuitry required to implement the system is somewhat complex and expensive.

One object of this invention is the provision of a simple, reliable reel-motor control circuit for a three position control system.

Another object of this invention is the provision of a three position reel-motor control circuit which eliminates the need for a mechanical brake even while the motor is at rest.

One more object of this invention is the provision of a three position reel-motor control circuit which uses a single transistor switch for controlling the braking current.

Briefly, this invention contemplates the provision of a three position reel-motor control circuit in which a resistor is coupled across the motor armature terminals to dissipate the kinetic energy of the reel-motor when the tape loop is between the sensors.

Preferably, the energy dissipating resistor is coupled across the armature terminals by means of a full wave rectifier and single transistor switch or other means which is driven into saturation when the end of the tape loop is between the sensors. However, it should be noted that, if desired, the energy dissipating resistor may be connected across the motor armature terminals continuously, although there is a consequential loss in efficiency.

An adjunct of this invention is the provision of a rectifier which provides a small unidirectional current flow through the motor armature to maintain the end of the loop between the sensors when the capstan is not rotating, thereby eliminating the need for a mechanical brake altogether.

The above and other objects and advantages of the invention will become apparent from a reading of the following description taken in conjunction with the accompanying drawing, in which the sole figure is a schematic view of an information tape transport and one embodiment of a reel-motor control circuit constructed in accordance with the teachings of this invention.

More particularly, referring now to the drawing, an information tape transport of a type well known in the prior art, has a left reel 12 and a right reel 14 rotatably mounted on a chassis (not shown). An information storage tape 16 extends between the reels and forms a buffering loop 18 in a vacuum chamber 22 associated with the reel 12, and a buffering loop 24 in a vacuum chamber 26 associated with the reel 14. A capstan 28 is adapted to drive the tape 16 past a transducer 32 which records information on the tape or reads information therefrom.

Mounted in each of the vacuum chambers 12 and 14 is an upper tape loop sensor 34 and a lower tape loop sensor 36. The sensors 34 and 36 are photoelectric diodes and are illuminated light sources 48 disposed opposite the sensors or in any other suitable position known in this art.

The outputs of sensors 34 and 36 in the chamber 22 are coupled to a left reel-motor control circuit 52, the output of which controls a shunt wound D.C. motor 54 which drives the left reel. The left reel-motor control circuit 52 is identical to the right reel-motor control circuit, and only the latter will be described in detail.

In the right reel control circuit, the anode of the upper photodiode sensor 34 is coupled to an oscillator 62 via an amplifier 56 and an inverter circuit 58. The output of oscillator 62 drives the primary of a transformer $T_1$. When the end of loop 24 rises above the upper sensor 34, the output of sensor 34 is —5 volts, for example, and the inverted input to oscillator 62 is positive, starting the oscillator 62 oscillating. When the end of loop 24 is below sensor 34, its output is +5 volts, for example, and the inverted input to oscillator 62 is negative, stopping oscillation.

Preferably, oscillators 62 and 68 are unijunction relaxation oscillators which oscillate at a frequency of approximately 1.5 kc. A suitable oscillator is described on page 56 of the 3rd edition of a publication entitled "SCR Manual," published by the General Electric Company, Rectifier Components Department, West Genesee Street, Auburn, New York.

Each of the transformers $T_1$ and $T_2$ has two secondary windings. The secondary windings of $T_1$ are designated $T_{1S}$ and those of $T_2$ are designated $T_{2S}$. The windings $T_{1S}$ are coupled between the gate electrode and cathode of a pair of silicon control rectifiers 86 and 88, respectively, and windings $T_{2S}$ are coupled between the gate electrode and cathode of a pair of silicon control rectifiers 76 and 78. As will be more fully explained below, rectifiers 76, 78, 86 and 88 comprise a circuit for controlling the flow of current in the armature 72 of the right reel motor, which is a shunt wound D.C. motor. The field winding 71 is excited from a suitable D.C. source (not shown).

A terminal 75 of the right reel motor armature 72 is connected to a center tap 77 on the secondary of a power transformer 74 the primary of which is coupled to a suitable 60 cycle A.C. power supply (not shown). Silicon controlled rectifiers (SCR) 78 and 88 couple the other armature terminal 73 to one outer terminal 84 of the transformer secondary, and SCR's 76 and 86 couple armature terminal 73 to the other outer transformer terminal 82.

Since the control electrodes of SCR's 86 and 88 are coupled to secondary windings $T_{1S}$ of transformer $T_1$, when high frequency oscillator 62 oscillates, SCR's 86 and 88 fire on alternate half cycles of the supply potential and conduct a unidirectional current through armature 72 from terminal 73 to terminal 75. This current flow causes the right reel motor to rotate the reel 14 in a clockwise direction. Similarly, since the control electrodes of SCR's 76 and 78 are coupled to the secondaries $T_{2S}$ of the transformer $T_2$, when high frequency oscillator 68 oscillates, SCR's 76 and 78 fire on alternate half cycles of the supply potential and conduct a unidirectional current through armature 72 from terminal 75 to terminal 73. This current flow causes the right reel motor to rotate the reel 14 in a counterclockwise direction.

A resistor 96 of small resistance, six ohms, for example, for dissipating the kinetic energy of armature 72 is coupled between terminals 73 and 75 by means of a PNP transistor switch 94 and a full wave rectifier 92. To the end that switch 94 conducts when the end of loop 24 is between sensors 34 and 36, the base of transistor 94 is coupled to the outputs of amplifiers 56 and 64 via an OR gate 102 and an inverter circuit 98. If either input to OR gate 102 is negative, its output is a negative potential. If neither input is negative, its output is a positive potential.

As will be more fully explained below, when the end of loop 24 is between the sensors, the base of transistor 94 rests at a negative potential; transistor 94 saturates and couples the resistor 96 across the terminals of armature 72.

In order to prevent oscillation of the tape loop 24 when no tape is being driven past the transducer 32 by the capstan 28, a full wave rectifier comprising diodes 104 and 106, coupled in series with respective current limiting resistors 108 and 112 of high resistance value, conduct a small unidirectional current through armature 72. This current flow prevents loop 24 from being sucked below the lower sensor when the capstan is at rest. The resistance value of resistors 108 and 112 is not critical; a resistor of fixed value operates satisfactorily both when the reel is full and when it is empty. For example, resistors of 120 ohms have proven satisfactory in a system where the tension on the tape is about eight ounces.

In operation, when the loop 24 is below the lower sensor, it covers both the upper sensor 34 and lower sensor 36. The output of sensor 34 is +5 volts and the output of sensor 36 is −5 volts, for example. With the output of sensor 34 at +5 volts, the output of inverter 58 is negative and oscillator 62 does not oscillate.

The −5 volt output of sensor 36 is amplified and inverted to a positive potential which starts oscillator 68 oscillating. SCR 76 and SCR 78 respectively conduct alternate half cycles of the power input from transformer 74 through armature 72 from terminal 75 to terminal 73. Thus energized, the right reel motor rotates reel 14 in a counterclockwise direction, moving the end of the tape loop 24 above the lower sensor 36.

Since the input to OR gate 102 from sensor 36 is negative, the output of this gate is a negative potential which is inverted by inverter 98 to a signal of positive potential. This positive potential maintains transistor 94 cut off.

With the end of the tape loop 24 above sensor 34, both sensors 34 and 36 are energized by light sources 48. The output of sensor 34 is −5 volts which is amplified and inverted to a positive potential which starts oscillator 62 oscillating. The output of sensor 36 is +5 volts, which is amplified by amplifier 64 and inverted by inverter 66 to a negative potential. Oscillator 68 does not oscillate. SCR's 86 and 88, therefore, conduct during alternate half cycles of the power signal from transformer 74 and conduct a unidirectional current through armature 72 from terminal 73 to terminal 75. This current causes motor armature 72 to rotate reel 14 in a clockwise direction. As will be appreciated by those skilled in the art, since the frequency of oscillators 62 and 68 is considerably higher than the frequency of the power signal of transformer 74, a gating signal is always present at the control grid of an SCR substantially simultaneously with the start of each power half cycle.

The output of OR gate 102 is negative, since its input from sensor 34 is negative. The output of inverter 98 is therefore positive, maintaining the transistor 94 cut off.

With end of the tape loop 24 between sensors, the output of both is +5 volts, and neither oscillator 62 nor 68 oscillates. In this case, the output of OR gate 102 is positive and that of inverter 98 is negative, turning transistor 94 on. Transistor 94 couples resistor 96 across the terminals 73 and 75 of the armature 72. Since the field winding 71 is energized, the EMF generated by a coasting armature 72 causes a current to flow in resistor 96 which dissipates the kinetic energy of the armature slowing it quickly. It should be noted that full wave rectifier 92 insures that current flows in a forward direction through transistor 94 irrespective of the polarity of the back EMF produced by a rotating armature 72.

This invention may be variously modified and embodied within the scope of the subjoined claims.

What is claimed is:

1. An improved circuit for controlling the rotation of an information tape storage reel, comprising in combination:

means for forming a buffering loop of tape,
a capstan for transporting said tape,
a motor coupled to the information storage reel for driving said reel,
means responsive to the length of said buffering loop,
first means including said responsive means for energizing said motor to rotate said reel in one sense when said loop exceeds a first predetermined length,
second means including said responsive means for energizing said motor to rotate said reel in a sense opposite said one sense when said loop is less than a second predetermined length, said second predetermined length being less than said first predetermined length,
third means including said responsive means for dissipating kinetic energy of said motor when the length of said loop is intermediate said first and said second lengths and said capstan is transporting said tape, and
fourth means for energizing said motor with a current sufficient to cause said motor to apply a torque to said reel to balance a tension on the tape when said tape is stationary and the length of said loop is intermediate said first and second predetermined lengths.

2. An improved circuit as in claim 1 wherein said coupling means includes a full wave rectifier for rectifying a current produced by said armature, a transistor switch, and means for driving said transistor switch into saturation when the length of said loop is intermediate said first and second predetermined lengths.

References Cited

UNITED STATES PATENTS

| | | | |
|---|---|---|---|
| 2,921,753 | 1/1960 | Lahti et al. | 242—55.12 |
| 3,203,635 | 8/1965 | Rayfield et al. | 242—55.12 |
| 3,254,855 | 6/1966 | Rayfield | 242—55.12 |
| 3,295,037 | 12/1966 | Bullene | 318—375 X |

ORIS L. RADER, *Primary Examiner.*

B. A. COOPER, *Assistant Examiner.*